(12) United States Patent
Hellgren (10) Patent No.: US 12,094,337 B2
(45) Date of Patent: Sep. 17, 2024

(54) METHOD AND DEVICE FOR VISUALIZING MULTIPLE VEHICLE TRAJECTORIES

(71) Applicant: Volvo Autonomous Solutions AB, Gothenburg (SE)

(72) Inventor: Jonas Hellgren, Gothenburg (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 289 days.

(21) Appl. No.: 17/477,063

(22) Filed: Sep. 16, 2021

(65) Prior Publication Data

US 2023/0083586 A1   Mar. 16, 2023

(51) Int. Cl.
  *G08G 1/13* (2006.01)
  *B60W 40/08* (2012.01)
  *H04W 4/40* (2018.01)

(52) U.S. Cl.
  CPC .............. *G08G 1/13* (2013.01); *B60W 40/08* (2013.01); *H04W 4/40* (2018.02); *B60W 2040/0881* (2013.01); *B60W 2552/53* (2020.02)

(58) Field of Classification Search
  CPC .......... G08G 1/13; H04W 4/40; B60W 40/08; B60W 2552/53; B60W 2040/0881
  See application file for complete search history.

(56) References Cited

U.S. PATENT DOCUMENTS

| 10,248,120 B1* | 4/2019 | Siegel | G05D 1/0223 |
| 10,304,334 B2* | 5/2019 | Okabe | B60W 30/165 |
| 2014/0032035 A1 | 1/2014 | Thomson | |
| 2015/0193994 A1* | 7/2015 | McQuade | G07C 5/008 |
| | | | 701/29.3 |
| 2019/0033808 A1 | 1/2019 | Mountford et al. | |
| 2019/0153701 A1 | 5/2019 | Gates | |
| 2019/0248287 A1* | 8/2019 | Ono | G02B 27/0101 |
| 2020/0184826 A1 | 6/2020 | Davis | |
| 2020/0198140 A1* | 6/2020 | Dupuis | B25J 9/1666 |
| 2020/0231386 A1* | 7/2020 | Shiu | B65G 1/1371 |
| 2020/0341490 A1* | 10/2020 | Silva | H04W 4/024 |
| 2021/0046929 A1* | 2/2021 | Wu | G08G 1/202 |
| 2021/0197811 A1* | 7/2021 | Tsushima | B60W 30/0956 |
| 2022/0262265 A1* | 8/2022 | Kashima | G08G 5/0069 |

* cited by examiner

*Primary Examiner* — Hussein Elchanti (74) *Attorney, Agent, or Firm* — Venable LLP; Jeffri A. Kaminski (57) ABSTRACT

A method of visualizing output data of a traffic planning method for controlling a plurality of vehicles (v1, v2, ... ), wherein each vehicle occupies one node in a shared set of planning nodes (wp1, wp2, ... ) and is movable to other nodes along predefined edges between pairs of the nodes, wherein the output data indicates respective planned node occupancies of the vehicles for a sequence of time steps, the method comprising: obtaining a graphical representation of the planning nodes; and in the graphical representation, indicating each vehicle's planned movements between the nodes by linear graphical elements, wherein an appearance parameter of the linear graphical elements has a time variation with respect to the time step, which time variation is common to all vehicles. The appearance parameter may be a line width, line style, color or texture.

10 Claims, 6 Drawing Sheets

METHOD AND DEVICE FOR VISUALIZING MULTIPLE VEHICLE TRAJECTORIES

TECHNICAL FIELD

The present disclosure relates to the field of automatic traffic planning. It presents a method and a device for visualizing a plurality of vehicle trajectories generated by a traffic planning algorithm, which can be utilized to assist an operator wanting to evaluate or configure the traffic planning algorithm.

BACKGROUND

Traffic planning algorithms find widespread use in the systematic solving of stipulated transportation tasks for which time and resource constraints apply. If the transportation task is to be carried out collectively by multiple vehicles that operate contemporaneously in a shared traffic system, the planning problem may have a very large solution space and a considerable number of constraints. The solution space may be understood as all feasible vehicle trajectories in a given traffic system, and the constraints could correspond to vehicles mutually blocking one another at intersections, one-way passages and the like.

None of the currently available traffic planning algorithms, whether optimization-based or constructive ones, is recognized as a de facto industry standard with an applicability to all or most traffic planning problems encountered. Instead, a common approach is to purchase or develop traffic planning software that suits the transportation task and the traffic system under consideration. Even a particular traffic planning algorithm in such software may itself be configurable with respect to many degrees of freedom, e.g., by modifying hyperparameters, initialization data and—in the case of optimization algorithms—parameters of the objective function. At this stage, the operator (e.g., an engineer) may need to conduct extensive testing to evaluate the planning algorithm's performance for different configurations. The testing can be made more efficient if the tools are at the operator's disposal that continually apprise him or her of the relevant aspects of the planning outcomes. It is a further benefit if the tools further help the operator to easily identify factors or patterns that cause the planning algorithm to sometimes produce inferior solutions.

The significant hourly cost of personnel with expertise in evaluating and configuring optimization algorithms justifies further efforts in the development of tools for visualizing multiple vehicle trajectories.

SUMMARY

One objective of the present disclosure is to make available methods and devices for visualizing multiple vehicle trajectories. Another objective is to enable visualization of vehicle trajectories that constitute output data of a traffic planning method for controlling a plurality of vehicles occupying nodes in a shared set of planning nodes. A further objective is to provide an intuitive visualization of the time dependence of the vehicle trajectories in that technical setting. A still further objective is to propose, for the purposes of such a visualization, useful annotations to assist an operator's task of evaluating a traffic planning algorithm and/or improve its performance by varying configuration parameters. In particular, the visualization may help the operator trace the causes of an unwanted set of node occupancies.

At least one of these objectives are achieved by the aspects of the present disclosure.

In a first aspect, there is provided a method of visualizing output data of a traffic planning method for controlling a plurality of vehicles. Each vehicle is assumed to occupy one node in a shared set of planning nodes and to be movable to other nodes along predefined edges between pairs of the nodes, wherein the output data indicates respective planned node occupancies of the vehicles for a sequence of time steps. The method comprises obtaining a graphical representation of the planning nodes and, in the graphical representation, indicating each vehicle's planned movements between the nodes by linear graphical elements. According to the first aspect, an appearance parameter of the linear graphical elements has a time variation with respect to the time step, and the time variation is common to all vehicles.

The method according to the first aspect efficiently conveys the time aspect of the vehicles' movements, namely, by expressing it as the time variation of the line segments. For example, if the appearance parameter is line width or color, an operator may look for all locations in the graphical representation with equal line width (or identical color) to get a snapshot of the vehicle positions at a corresponding time step. This inspection may be repeated for a different line width value (or a different color). From such inspections, the operator may evaluate to what extent two or more vehicles move close to each other, which may be a sign that they are mutually blocking and that the traffic planning method may not be solving the transportation task with optimal efficiency. In this case, the operator may consider applying a modified configuration of the traffic planning method (e.g., hyperparameters, initialization data, parameters of the objective function) to explore whether it produces better vehicles movements and or node occupancies of the vehicles. These movements or node occupancies may be perceived as better, for example, since they solve a transportation task in shorter time, with less resource expenditure, greater safety margins and/or with fewer cases of vehicles blocking each other. Accordingly, the proposed method according to the first aspect may be used by an operator to fine-tune settings or initial values of a traffic planning method.

A further utility of the proposed method is to verify, as an additional human-executed safety measure, that the planned node occupancies correspond to collision-free movement of the vehicles.

In some embodiments, the appearance parameter is line width or line style, or both. Additionally or alternatively, the appearance parameter is color and/or texture. Furthermore, the linear graphical elements include line segments or curve segments or a combination of these. As used in the present disclosure, a "line segment" or "curve segment" can be solid or non-solid. The non-solid options include dotted, dashed, dash-dotted lines or curves, which are interrupted by imaginary lifts of the drawing instrument.

In some embodiments, the graphical representation contains annotations indicating such groups of planning nodes that allow occupancy of a single vehicle only. Such groups may for instance correspond to waypoints in a road segment where traffic is being routed two ways but the width does not allow two vehicles to meet. The annotations help the operator understand in more detail the task that the traffic planning method has attempted to solve. Specifically, the operator may realize more easily why the traffic planning method does not route vehicles to seemingly empty planning nodes.

In some embodiments, as an alternative or addition to those just described, the graphical representation contains annotations indicating node occupancies where a first vehicle blocks onward movement of a second vehicle or multiple second vehicles. The blocking state can be detected by evaluating the closeness of the vehicles, optionally by taking into account the safe following distance applied by the traffic planning method. This type of annotations helps the operator estimate the extent to which the traffic planning method is being limited by node occupancies constituting blocking states. In cases where the operator believes the transportation task could be solved more efficiently if there were less such blocking states, the operator may modify settings of the traffic planning method to explore whether this improves the output.

In a second aspect of the present disclosure, there is provided a device configured to visualize output data of a traffic planning method for controlling a plurality of vehicles, wherein each vehicle occupies one node in a shared set of planning nodes and is movable to other nodes along predefined edges between pairs of the nodes. The device comprises: an input interface configured to receive the output data of the traffic planning method, wherein the output data indicates respective planned node occupancies of the vehicles for a sequence of time steps; processing circuitry configured to process the output data of the traffic planning method to determine each vehicle's planned movements between the nodes; and a graphical output interface configured to render a graphical representation of the planning nodes, and render linear graphical elements corresponding to each vehicle's planned movements between the nodes, wherein an appearance parameter of the linear graphical elements has a time variation with respect to the time step, which time variation is common to all vehicles.

The effects and advantages of the second aspect generally coincide with those of the first aspect, and it can be implemented with a corresponding degree of technical variation.

The invention further relates to a computer program containing instructions for causing a computer, or the just described device in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments are shown. These aspects may, however, be embodied in many different forms and should not be construed as limiting; rather, these embodiments are provided by way of example so that this disclosure will be thorough and complete, and to fully convey the scope of all aspects to those skilled in the art. Like numbers refer to like elements throughout the description.

Figure 1:
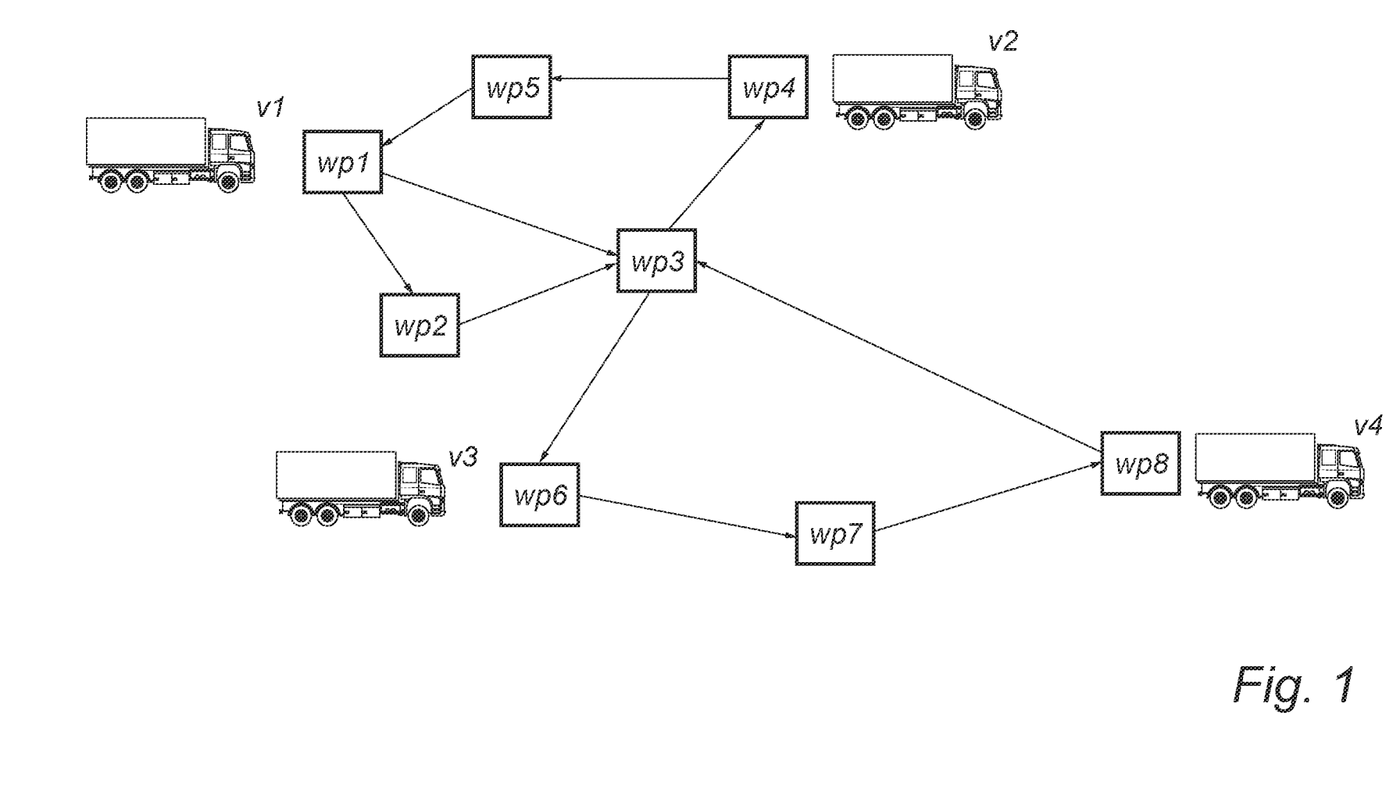
FIG. 1 is a schematical representation of a road network with numbered waypoints.

FIG. 1 is a schematic representation of a road network. Waypoints are defined at the road junctions wp1, wp3 and additionally at some intermediate locations wp2, wp4, wp5, wpb, wp7 and wp8. Some of the intermediate locations may correspond to so-called absorption nodes, where a visiting vehicle is required to dwell for a predetermined or variable time, for purposes of loading, unloading, maintenance etc. The arrangement of the waypoints is not essential to the present invention, rather their locations and number may be chosen (defined) as deemed necessary in each use case to achieve smooth and efficient traffic control. The waypoints are treated as planning nodes which are shared by a plurality of vehicles v1, v2, v3, v4. Abstractly, a planning node may be understood as a logical entity which is either free or occupied by exactly one vehicle at a time. An occupied node is not consumed but can be released for use by the same or another vehicle. Planning nodes may represent physical space for transport (road segments, road junctions) or parking, a communication channel, maintenance machinery, additional equipment for optional temporary use, such as tools or trailers.

Each vehicle (see FIG. 3) is controllable by an individual control signal, which may indicate a command from a finite set of predetermined commands. If the vehicles are autonomous, the control signal may be a machine-oriented signal which controls actuators in the vehicle; if the vehicles are conventional, the control signals may be human-intelligible signals directed to their drivers. It is understood that individual control signals may be multiplexed onto a common carrier. A predefined command may represent an action to be taken at the next waypoint (e.g., continue straight, continue right, continue left, stop), a next destination, a speed adjustment, a loading operation or the like. Implicit signaling is possible, in that a command has a different meaning depending on its current state (e.g., toggle between an electric engine and a combustion engine, toggle between high and low speed, drive/wait at the next waypoint). A vehicle which receives no control signal or a neutrally-valued control signal may be configured to continue the previously instructed action or to halt. The predetermined commands preferably relate to tactical decision-making, which corresponds to a time scale typically shorter than strategic decision-making and typically longer than operational (or machine-level) decision-making. Different vehicles may have different sets of commands.

One aim of the present disclosure is to assist efficient centralized control of the vehicles v1, v2, v3, v4. The vehicles v1, v2, v3, v4 are to be controlled as a group, with mutual coordination. The mutual coordination may entail that any planning node utilization conflicts that could arise between vehicles are deferred to a planning algorithm and resolved at the planning stage. The planning may aim to maximize productivity, such as the total quantity of useful transport system work or the percentage of on-schedule deliveries of goods. The planning may additionally aim to minimize cost, including fuel consumption, battery aging, mechanical component wear or the like.

Regarding the planning node utilization conflicts that may arise, it may initially be noted that if each vehicle moves one waypoint per epoch, then no vehicle blocks this movement of any other vehicle for the node occupancies (start state) shown in FIG. 1. These node occupancies may be written as $$O\begin{pmatrix} v1 \\ v2 \\ v3 \\ v4 \end{pmatrix} = \begin{pmatrix} wp1 \\ wp4 \\ wp6 \\ wp8 \end{pmatrix}.$$

It can also be seen that these node occupancies provide each vehicle with a next waypoint to which it can move in a next epoch. The choice of the next waypoint is not arbitrary, as both vehicles v1 and v4 could theoretically move to waypoint wp3 simultaneously. This conflict can however be avoided by routing vehicle v1 to waypoint wp2 instead, so that waypoint wp3 remains free for use by vehicle v4. If the system is evolved in the second manner, that is, $$O\begin{pmatrix} v1 \\ v2 \\ v3 \\ v4 \end{pmatrix} = \begin{pmatrix} wp2 \\ wp5 \\ wp7 \\ wp3 \end{pmatrix},$$

then vehicle v4 will block vehicle v1 from moving to the next waypoint wp3. This blocking state temporarily reduces the vehicle system's productivity but will be resolved once vehicle v4 continues to waypoint wp4 or wpb.

It is easy to realize that the difficulty of the blocking states (as measured, say, by the number of vehicle movements needed to reach a non-blocking state) in a given waypoint topology will increase with the number of vehicles present. The efficiency gain of deploying marginally more vehicles to solve a given transportation task in a given environment may therefore be offset by the increased risk of conflicts. A waypoint topology populated with many vehicles may also have more deadlock states, i.e., states where no vehicle movement is possible. As mentioned, a deadlock state may correspond to a real-life scenario where the controlled vehicles need external help to resume operation, such as operator intervention, towing etc.

The following description is made under an assumption of discrete time, that is, the traffic system evolves in evenly spaced epochs. The length of an epoch may be of the order of 0.1 s, 1 s, 10 s or longer. At each epoch, either a command a1, a2 is given to one of the vehicles v1, v2, v3, v4, a command is given to a predefined group of vehicles, or no command is given. Quasi-simultaneous commands v1.a1, v2.a1 to two vehicles v1, v2 or two vehicle groups can be distributed over two consecutive epochs. To allow approximate simultaneity, the epoch length may be configured shorter than the typical time scale of the tactical decision-making for one vehicle. With this setup, the space of possible planning outcomes corresponds to the set of all command sequences of length d, where d is the planning horizon (or lookahead horizon).

Figure 8:
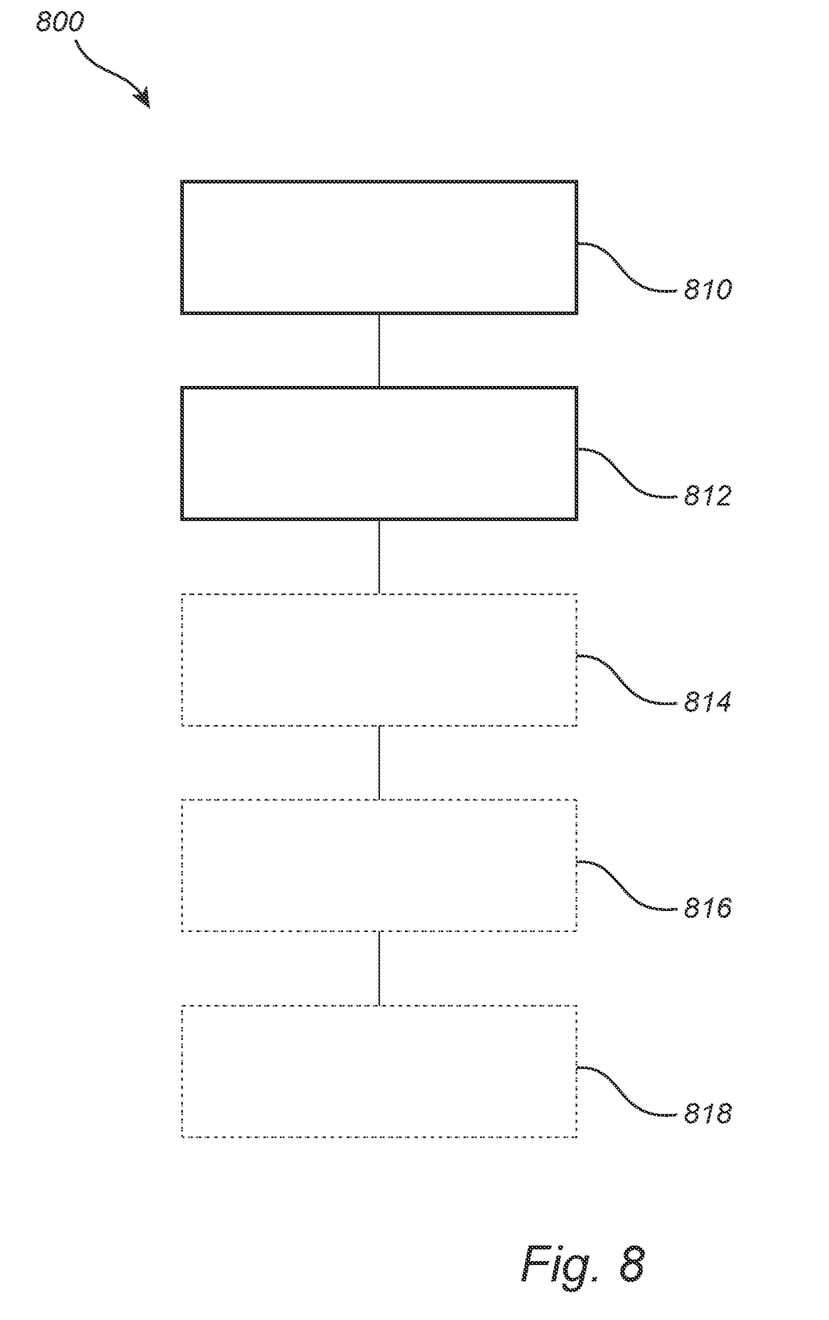
FIG. 8 is flowchart of a method of visualizing output data of a traffic planning method for controlling a plurality of vehicles, according to embodiments herein.

With reference now to FIG. 8, a traffic planning method 800 according to one embodiment of the invention will be described. The method 800 may be implemented by a general-purpose programmable computer, or in particular by the device 200 shown in FIG. 2 to be described below.

A purpose of the method 800 is to visualize output data of a traffic planning method. The traffic planning method may be executed by the same entity as performs the visualization method 800, or by a different entity. The output data of the traffic planning method is related to the control of a plurality of vehicles and indicates—directly or implicitly—respective planned planning-node occupancies of the vehicles for a sequence of time steps. Possible formats of the output data include:

(a) sequences of commands to be given to the vehicles in respective time steps,
(b) each vehicle's node occupancy in respective time steps, (c) snapshots of the vehicles' node occupancies in respective time steps. The output data can be formatted as machine-oriented instructions addressed to autonomous vehicles or as human-readable instructions directed to drivers of conventional vehicles.

In a first step 810, a graphical representation of the planning nodes is obtained. The graphical representation includes the planning nodes and edges that connect pairs of the planning nodes, wherein each edge corresponds to a possible vehicle movement. The graphical representation need not include any present or future node occupancy of a vehicle. The graphical representation may be provided (rendered) by the same entity as performs the method 800, or the graphical representation may be obtained in already rendered format from a different entity. The rendered format may be a static vector or bitmap image, on which the graphical elements generated by the execution of the method 800 are overlaid. If the graphical representation of the planning nodes is void of node-occupancy information, it can be reused between different execution cycles of the method 800.

A second step 812 of the method 800, each vehicle's planned movements between the nodes are indicated by linear graphical elements. The linear graphical elements may consist of or include line segments or curve segments, with their endpoints in the planning nodes between which a vehicle moves. As mentioned, such line segments may be drawn in solid line, or they may be dashed, dotted etc. An appearance parameter of the linear graphical elements shall have a time variation with respect to the time step, and the time variation shall be common to all vehicles.

Figure 4A:
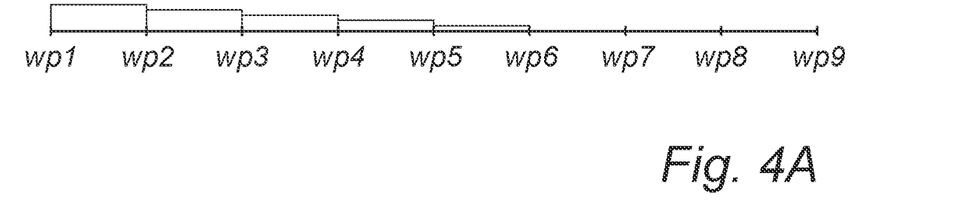
FIG. 4A illustrates a vehicle's movement between waypoints wp1-wp6 by linear graphical elements (line segments) with varying line width and uniform color.
Figure 4B:
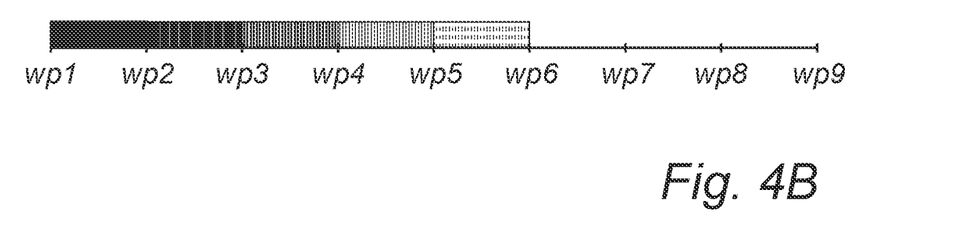
FIG. 4B illustrates the same vehicle movement as FIG. 4B, however, using linear graphical elements with varying color (hatching) and uniform line width.
Figure 5:
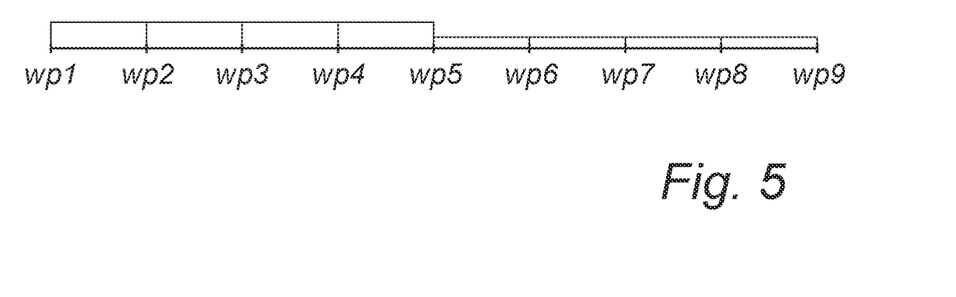
FIG. 5 illustrates, in the symbolism of FIG. 4A, a vehicle's movement from waypoint wp1 to wp5 in a first time step and, in a next time step, the same vehicle's movement from waypoint wp5 to wp9.

To illustrate the time variation of the linear graphical elements' appearance, FIG. 4 shows, in two different formats, a vehicle's movement between waypoints wp1-wp6 in a simple linear road network without any junctions. In FIG. 4A, a gradually decreasing line width is used to express the time dimension of the movement. In FIG. 4B, color (texture) conveys the corresponding information, wherein more precisely lighter shades correspond to movements at more advanced points in time. Because no two line segments have the same line width (same color hue) in FIGS. 4A and 4B, it can be appreciated that the vehicle passes by waypoints wp2-wp5 on its journey from waypoint wp1 to wpb. In FIG. 5, by contrast, one line width is used for the movement from waypoint wp1 to wp5 whereas a smaller line width is used for the movement from waypoint wp5 to wp9. A possible interpretation of this is that the vehicle moves from waypoint wp1 to wp5 without visiting waypoints wp2-wp4, or without stopping at waypoints wp2-wp4. Similarly, it may be concluded that the vehicle moves from waypoint wp5 to wp9 without visiting waypoints wp6-wp8, or without stopping at waypoints wp6-wp8. It may at least be derived from FIG. 5 that the vehicle stays longer at waypoint wp5 than at waypoints wp2-wp4 and wp6-wp8. A time variation as exemplified in FIGS. 4 and 5 shall be common to all vehicles, so that an operator viewing the graphical representation is able to determine—at least approximately—that two vehicles' movement are contemporaneous.

In the just described way of varying of the linear graphical elements' appearance, the linear graphical element between a pair of consecutive planning nodes shall have a uniform appearance. The uniform appearance may correspond to (a) the time step in which the movement begins, (b) the time step in which the movement ends, or (c) the time step during which the movement is performed; this may be determined by a predetermined rule for the visualization. As an alternative to this way of varying of the linear graphical elements' appearance, each linear graphical element can have an appearance that varies with the position between the planning nodes. For example the initial portion of the graphical element can have the appearance (i.e., color, width) of the start time step, the final portion of the graphical element can have the appearance of the end time step, and the intervening portion can be an interpolation between these appearances. Such a gradual transition of the appearance over the course of a connecting linear graphical element may convey the direction of movement in an intuitive manner. The gradual transition further expresses the vehicle movement on a more fine-grained time scale than if a simple association rule, like the above-mentioned rules (a) or (b), is applied.

Figure 6:
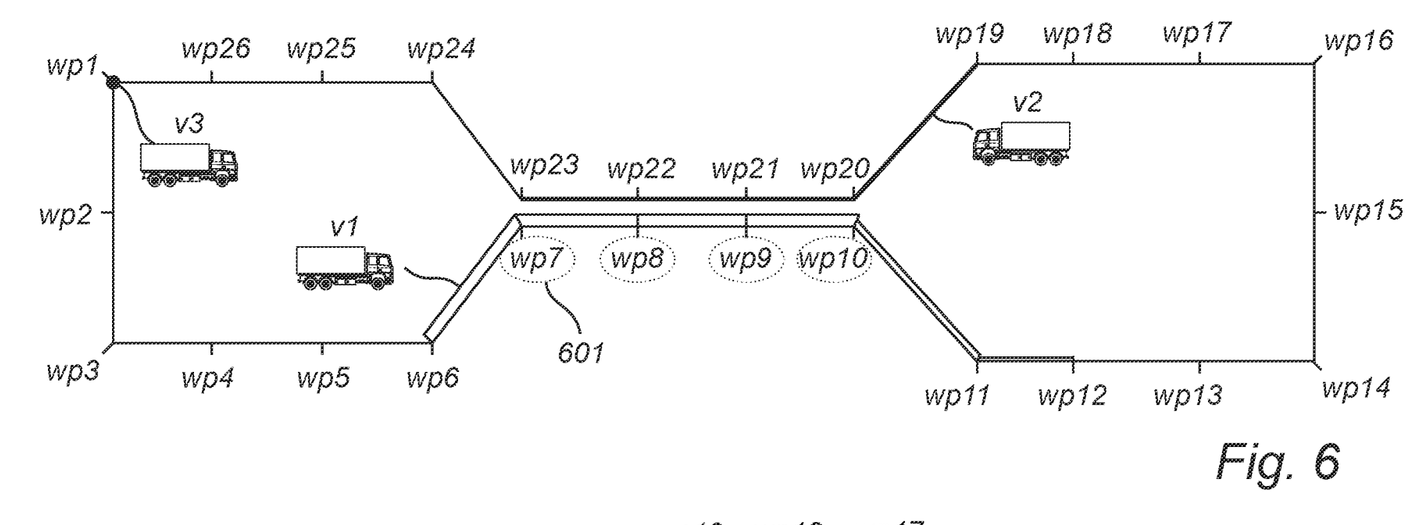
FIG. 6 is a graphical representation of a road network where the node occupancies of three vehicles have been illustrated and where annotations (waypoint labels encircled by dotted line) indicate node occupancies blocking another vehicle's movement.

FIG. 6 illustrates an example output of the first and second steps 810, 812 which is overlaid is on a graphical representation of a road network where vehicles can move freely between planning nodes (or waypoints) wp1-wp26. There are no junctions. The connections define a circuit which allows a vehicle to traverse all twenty-six planning nodes. In this example, the planned node occupancies of three vehicles v1, v2, v3 are to be indicated in the graphical representation using line segments with variable line width (decreasing over time), which is therefore suitable for monochrome rendering. If coloring is available, it can be used to make the plotted trajectories more distinguishable across vehicles. The initial node occupancies are:

$$O\begin{pmatrix}v1\\v2\\v3\end{pmatrix}=\begin{pmatrix}wp6\\wp19\\wp1\end{pmatrix}.$$

The following movements can be derived from the indications in FIG. 6. The first vehicle v1 moves from wp6 via wp7-wp9 to wp10 (10% of full line width). It then continues to wp11 (75% of full line width). After this, it continues to wp12 (50% of full line width). After the first vehicle has arrived at wp12, the second vehicle v2 moves from wp19 via wp20-wp22 to wp23 (25% of full line width). The third vehicle v3 is stationary at node wp1.

Figure 7:
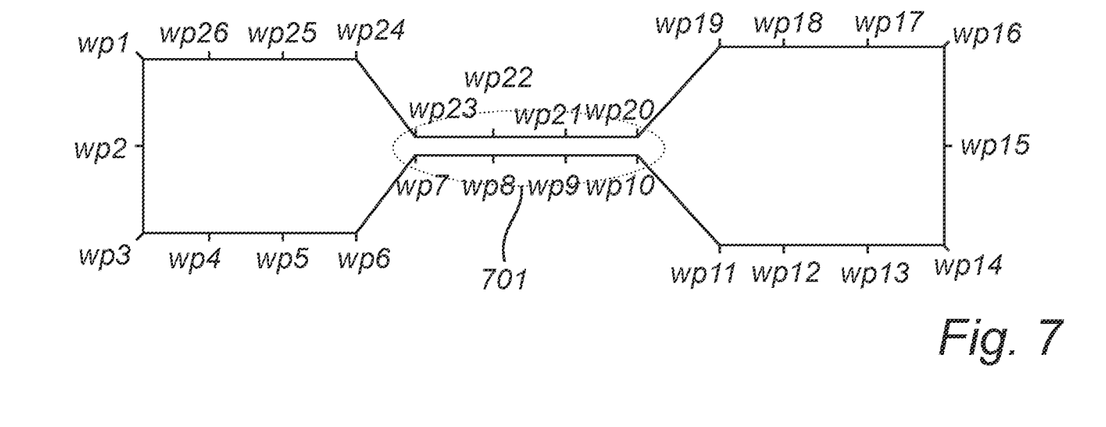
FIG. 7 is a graphical representation of the road network in FIG. 6, where further annotations (waypoint labels encircled by dotted line) indicate a group of planning nodes which allows occupancy of a single vehicle only.

In some embodiments, the method 800 additionally comprises a third step 814, where the graphical representation is annotated with groups of planning nodes allowing occupancy of a single vehicle only. FIG. 7 shows an example of such an annotation 701. In this road network, vehicles are not allowed to occupy planning nodes wp7-wp10 and wp20-wp23 contemporaneously. In FIG. 7, these waypoints are encircled by a dotted oval. (It is noted in passing that the road network shown in FIG. 7 would not be equivalent to a network where nodes wp7-wp10 and wp20-wp23 were combined into one. Indeed, such a combined node "7+8+9+10+20+21+22+23" would not reflect the fact that a vehicle arriving from node wp6 would always exit at node wp11, and a vehicle reaching the combined node "7+8+9+10+20+21+22+23" from node wp19 would exit at node wp24.) Accordingly, when the vehicles v1, v2 are in the initial positions shown in previously described FIG. 6, the following options are open to the traffic planner: (a) let the second vehicle v2 wait, route the first vehicle v1 through the corridor wp7-wp10, and then route the second vehicle v2 through the corridor wp20-wp23, or (b) let the first vehicle v1 wait, route the second vehicle v2 through wp20-wp23, and then route the first vehicle through wp7-wp10. It is seen that under option b), all three vehicles v1, v2, v3 will be present in the left half of the road network, relatively close to each other, so that blocking states are likely to occur, to the potential detriment of the transportation efficiency. Configuration of a traffic planning method that favor this option can be identified with the aid of visualizations produced by the method 800, and the algorithm can be tuned accordingly.

In some embodiments, the method 800 additionally comprises a fourth step 816 of processing the output data of the traffic planning method to detect a node occupancy of one vehicle which blocks onward movement of at least one other vehicle and a fifth step 818 of annotating the graphical representation with the detected node occupancy. FIG. 6 shows an annotation 601 of this kind applied to nodes wp7-wp10. An operator will interpret the placement of this annotation 601 to mean: while the first vehicle v1 occupies any of nodes wp7-wp10, it is restricting the onward movement of the second vehicle v2. The second vehicle's v2 waiting time at node wp19 prevents it from performing the set transportation task. Too frequent occurrences of node occupancies where vehicles are blocking each other (blocking states) can be a sign of low efficiency. Therefore, this type of annotations 601 helps the operator determine to what extent the traffic planning method is limited by blocking states. In cases where the operator believes the transportation task could be solved more efficiently if there were fewer such blocking states, the operator may modify settings of the traffic planning method to explore whether this improves the output.

With regard to step 816, the blocking condition can be detected by evaluating the closeness of the vehicles, optionally by taking into account the safe following distance that the traffic planning method applies. Some classes of traffic planning methods rely, at least in part and possibly supplemented by central coordination, on local logic in the individual vehicles. The logic may be formulated as a local decision rule which determines, on the basis of the distance to the vehicle in front, whether the self vehicle shall continue at full speed, slow down or stop. The stop option may be selected if the self vehicle is being blocked by the vehicle in front. In connection with a traffic planning method of this type, therefore, the visualization method 800 may evaluate the local decision rule for each vehicle and each set of node occupancies, to determine which vehicles experience the condition of being blocked, and in which time steps. This may form the basis for adding the annotations 601 shown in FIG. 6.

Figure 2:
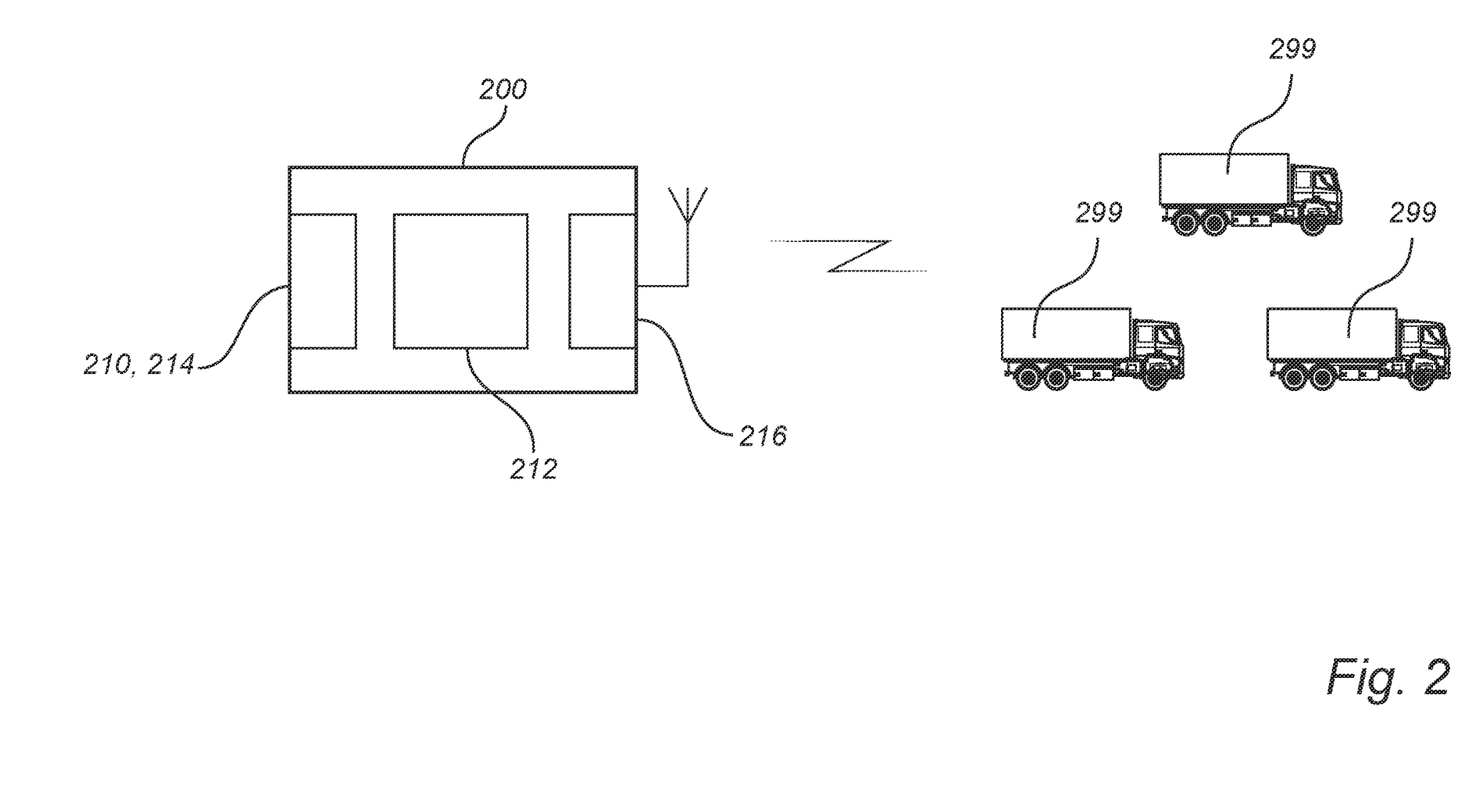
FIG. 2 shows a device suitable for controlling a plurality of vehicles.

FIG. 2 shows, in accordance with a further embodiment, a device 200 for controlling a plurality of vehicles 299 sharing a set of planning nodes. The device 200, which may be referred to as a traffic planner, has a first interface 210 configured to receive initial node occupancies of the vehicles 299. Optionally, it may further receive, for each vehicle, information representing a set of predefined commands v1.a1, v1.a2, v2.a1, v2.a2, which can be fed to the respective vehicles, and/or a mission (transportation task) to be carried out may by the vehicles 299. The initial node occupancies may be obtained from a traffic control entity (not shown) communicating with the vehicles 299, from sensors (not shown) detecting the positions of the vehicles 299, or from replies to a self-positioning query which are issued to the vehicles 299. The optional information may be entered into the first interface 210 by an operator or provided as configuration data once it is known which vehicles 299 will form the fleet.

The device 200 further has a second interface 216 configured to feed commands selected from said predefined commands to said plurality of vehicles, as well as processing circuitry 212 configured to perform the method 100 described above. FIG. 2 shows direct wireless links from the second interface 216 to the vehicles 299. In other embodiments, as explained above, the second interface 216 may instead feed sequences of the predefined commands to the traffic control entity, which takes care of the delivery of the commands to the vehicles 299.

The device 200 further include a graphical output interface 214 configured to render a graphical representation of the planning nodes and to indicate therein the planned movements of the vehicles, optionally together with various types of annotations. The first interface 210 and the graphical output interface 214 may be implemented as a combined operator interface, such as a graphical human-machine interface (HMI) including a visual display, keyboard and a pointing device.

Figure 3:
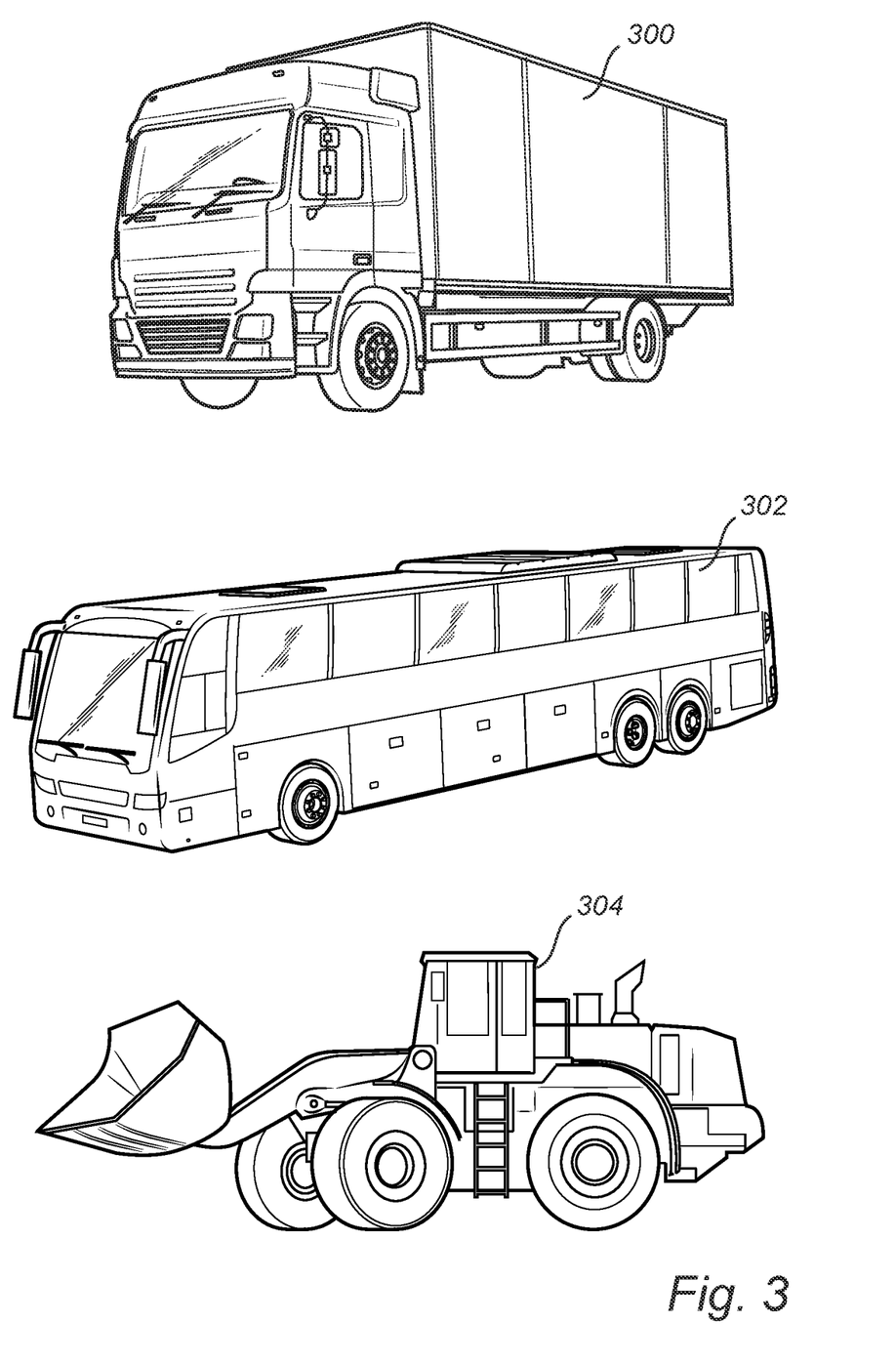
FIG. 3 shows example vehicles that can be controlled centrally using embodiments of the invention.

FIG. 3 shows a truck 300, a bus 302 and a construction equipment vehicle 304. A fleet of vehicles of one or more of these types, whether they are autonomous or conventional, can be controlled in a centralized fashion using the device 200 described above, and the method 800 may visualize their planned trajectories.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of visualizing output data of a traffic planning method for controlling a plurality of vehicles, wherein each vehicle occupies one node in a shared set of planning nodes and is movable to other nodes along predefined edges between pairs of the nodes, wherein the output data indicates respective planned node occupancies of the vehicles for a sequence of time steps, the method comprising:
rendering a graphical representation of the planning nodes using a graphical output interface; and
in the graphical representation, indicating each vehicle's planned movements between the nodes by rendering linear graphical elements,
wherein an appearance parameter of the linear graphical elements has a time variation with respect to the time step, which time variation is common to all vehicles, such that all locations in the graphical representation with equal values of the appearance parameter refer to a corresponding time step.

2. The method of claim 1, wherein the appearance parameter is line width and/or line style.

3. The method of claim 1, wherein the appearance parameter is color and/or texture.

4. The method of claim 1, wherein linear graphical elements include one or more of: line segments, curve segments.

5. The method of claim 1, further comprising:
annotating the graphical representation with groups of planning nodes allowing occupancy of a single vehicle only.

6. The method of claim 1, further comprising:
processing the output data of the traffic planning method to detect a node occupancy of a first vehicle which blocks onward movement of at least one second vehicle; and annotating the graphical representation with the detected node occupancy.

7. The method of claim 1, wherein the appearance parameter of the linear graphical elements has the time variation with respect to the time step in which (a) the planned movement between the nodes begin, (b) the planned movement between the nodes ends, and/or (c) the planned movement between the nodes is performed.

8. A device configured to visualize output data of a traffic planning method for controlling a plurality of vehicles, wherein each vehicle occupies one node in a shared set of planning nodes and is movable to other nodes along predefined edges between pairs of the nodes, the device comprising:
an input interface configured to receive the output data of the traffic planning method, wherein the output data indicates respective planned node occupancies of the vehicles for a sequence of time steps;
processing circuitry configured to process the output data of the traffic planning method to determine each vehicle's planned movements between the nodes; and a graphical output interface configured to
render a graphical representation of the planning nodes, and
render linear graphical elements corresponding to each vehicle's planned movements between the nodes,
wherein an appearance parameter of the linear graphical elements has a time variation with respect to the time step, which time variation is common to all vehicles, such that all locations in the graphical representation with equal values of the appearance parameter refer to a corresponding time step.

9. A non-transitory computer readable medium storing program code which, when executed, cause a programmable computer to perform operations, in visualizing output data of a traffic planning method for controlling a plurality of vehicles, wherein each vehicle occupies one node in a shared set of planning nodes and is movable to other nodes along predefined edges between pairs of the nodes, wherein the output data indicates respective planned node occupancies of the vehicles for a sequence of time steps, comprising:
- rendering a graphical representation of the planning nodes using a graphical output interface; and
- in the graphical representation, indicating each vehicle's planned movements between the nodes by rendering linear graphical elements,
- wherein an appearance parameter of the linear graphical elements has a time variation with respect to the time step, which time variation is common to all vehicles, such that all locations in the graphical representation with equal values of the appearance parameter refer to a corresponding time step.

10. The non-transitory computer readable medium of claim 9 wherein the appearance parameter of the linear graphical elements has the time variation with respect to the time step in which (a) the planned movement between the nodes begin, (b) the planned movement between the nodes ends, and/or (c) the planned movement between the nodes is performed.

* * * * *